(12) United States Patent
Modrusan et al.

(10) Patent No.: US 11,919,326 B2
(45) Date of Patent: Mar. 5, 2024

(54) KINETIC DEVICE, SYSTEM, AND METHOD

(71) Applicants: Nikola Modrusan, San Diego, CA (US); Jacob Bryan, San Diego, CA (US)

(72) Inventors: Nikola Modrusan, San Diego, CA (US); Jacob Bryan, San Diego, CA (US)

( * ) Notice: Subject to any disclaimer, the term of this patent is extended or adjusted under 35 U.S.C. 154(b) by 281 days.

(21) Appl. No.: 17/591,536

(22) Filed: Feb. 2, 2022

(65) Prior Publication Data
US 2022/0250406 A1 Aug. 11, 2022

Related U.S. Application Data

(60) Provisional application No. 63/146,055, filed on Feb. 5, 2021.

(51) Int. Cl.
*F16H 1/28* (2006.01)
*B44B 1/06* (2006.01)
*B44F 1/02* (2006.01)

(52) U.S. Cl.
CPC .............. *B44B 1/06* (2013.01); *F16H 1/28* (2013.01); *B44F 1/02* (2013.01)

(58) Field of Classification Search
CPC ..... B44B 1/06; B44F 1/02; B44C 5/00; G09F 19/02; G09F 19/12; F16H 1/222; F16H 1/28–48; F21V 33/0028; F21W 2121/02
See application file for complete search history.

(56) References Cited

U.S. PATENT DOCUMENTS

| | | | |
|---|---|---|---|
| 5,090,936 A * | 2/1992 | Satoh | B44C 5/00 446/175 |
| 6,979,197 B2 * | 12/2005 | Cho | G09B 27/08 434/145 |
| 2009/0084008 A1 * | 4/2009 | Middleton | G09F 19/08 40/430 |
| 2019/0091876 A1 * | 3/2019 | Xiong | F16H 19/001 |
| 2021/0154830 A1 * | 5/2021 | Lee | F16H 1/28 |

* cited by examiner

*Primary Examiner* — Jacob S. Scott
*Assistant Examiner* — Farhana Pervin
(74) *Attorney, Agent, or Firm* — ROEDER & BRODER LLP; James P. Broder

(57) ABSTRACT

A kinetic device (100) includes a rotator (102), a hub assembly (103), a mover (108), and a pinion assembly (110). The rotator (102) has a rotator axis (102X). The hub assembly (103) is coupled to the rotator (102). The hub assembly (103) includes a hub (104) having an aperture (107). The mover (108) rotates the rotator (102) and the hub assembly (103). The pinion assembly (110) is coupled to the aperture (107). The pinion assembly (110) includes an arm coupler (114). The mover (108) is configured to rotate a portion of the hub assembly (103) so that the pinion assembly (110) and the arm coupler (114) rotate about the rotator axis (102X).

20 Claims, 9 Drawing Sheets

KINETIC DEVICE, SYSTEM, AND METHOD

RELATED APPLICATION

This application claims priority on U.S. Provisional Application Ser. No. 63/146,055, filed on Feb. 5, 2021, and entitled "KINETIC DEVICE AND METHOD FOR MANUFACTURING." To the extent permitted, the contents of U.S. Provisional Application Ser. No. 63/146,055 are incorporated in their entirety herein by reference.

BACKGROUND

Modern artwork, such as fixed and movable sculptures, can provide fascinating visual stimuli in locations ranging from private residences to public galleries and other outdoor areas. Such creations can provide underlying meaning and symbolism and offer expressive imagery across various motifs. Traditional art and sculptures tend to be static, visual, and/or tangible three-dimensional objects. More recently, innovative artwork can include more of a dynamic or fluid component, thereby achieving a new visual experience and/or interpretation for museumgoers and other art-lovers.

SUMMARY

The present invention is directed toward a kinetic device. In various embodiments, the kinetic device includes a rotator, a hub assembly, a mover, and a pinion assembly. The rotator has a rotator axis. The hub assembly is coupled to the rotator. The hub assembly includes a hub having an aperture. The mover rotates the rotator and the hub assembly. The pinion assembly is coupled to the aperture. The pinion assembly includes an arm coupler. The mover is configured to rotate a portion of the hub assembly so that the pinion assembly and the arm coupler rotate about the rotator axis.

In certain embodiments, the hub assembly includes (i) a first gear that is coupled to the hub, and (ii) a second gear that is coupled to the hub.

In various embodiments, the hub assembly includes a bearing assembly that is coupled to the hub and the second gear, the bearing assembly being configured to enable rotation of the hub.

In some embodiments, the pinion assembly includes a pinion having a pinion axis, the pinion being coupled to the arm coupler, and the mover is configured to rotate a portion of the hub assembly so that the pinion assembly, the pinion, and the arm coupler rotate about the pinion axis.

In certain embodiments, the rotator axis is substantially orthogonal to the pinion axis.

In various embodiments, the pinion assembly includes a pinion fastener that fastens the arm coupler to the pinion.

In some embodiments, the pinion assembly includes an aperture bearing that is coupled to the pinion fastener and the aperture.

In certain embodiments, the arm coupler is coupled to the pinion so that the arm coupler is substantially perpendicular to the pinion axis.

In various embodiments, the kinetic device further includes a plurality of pinion assemblies.

In some embodiments, the pinion assembly includes an arm that is coupled to the arm coupler.

In certain embodiments, the kinetic device further includes a first pinion assembly and a second pinion assembly, the pinion assemblies being coupled to the hub, each of the pinion assemblies including (i) a pinion having a corresponding pinion axis, and (ii) an arm coupler coupled to the pinion, each of the arm couplers being simultaneously positioned about the corresponding pinion axes at approximately the same rotational orientation as one another.

In various embodiments, the kinetic device further includes a first pinion assembly and a second pinion assembly, the pinion assemblies being coupled to the hub, each of the pinion assemblies including (i) a pinion having a corresponding pinion axis, and (ii) an arm coupler coupled to the pinion, each of the arm couplers being simultaneously positioned about the corresponding pinion axes at different rotational orientations from one another.

The present invention is also directed toward a kinetic device. In various embodiments, the kinetic device includes a rotator, a hub assembly, a mover, and a plurality of pinion assemblies. The rotator has a rotator axis. The hub assembly is coupled to the rotator. The hub assembly includes a hub having a plurality of apertures. The mover rotates the rotator and the hub assembly. The plurality of pinion assemblies are coupled to the plurality of apertures. Each of the plurality of pinion assemblies includes (i) a pinion, and (ii) an arm coupler that is coupled to the pinion. The mover can be configured to rotate a portion of the hub assembly so that each of the plurality of pinion assemblies rotates about the rotator axis.

In certain embodiments, the hub assembly includes a gear that is coupled to the hub.

In various embodiments, the hub assembly includes a bearing assembly that is coupled to the hub and the gear, the bearing assembly being configured to enable rotation of the hub.

In some embodiments, each of the plurality of pinion assemblies has a corresponding pinion axis and the mover is configured to rotate a portion of the hub assembly so that each of the plurality of pinion assemblies rotates about each of the corresponding pinion axes.

In certain embodiments, the rotator axis is substantially orthogonal to each of the corresponding pinion axes.

In various embodiments, the arm coupler is coupled to the pinion so that the arm coupler is substantially orthogonal to each of the corresponding pinion axes.

In some embodiments, each of the plurality of pinion assemblies includes a pinion fastener that fastens the arm coupler to the pinion.

In certain embodiments, each of the plurality of pinion assemblies includes a pinion fastener that fastens the arm coupler to the pinion.

In various embodiments, each of the plurality of pinion assemblies includes an aperture bearing that is coupled to the pinion fastener and the aperture.

The present invention is further directed toward a kinetic device. In various embodiments, the kinetic device includes a rotator, a hub assembly, a mover, and a plurality of pinion assemblies. The rotator has a rotator axis. The hub assembly is coupled to the rotator. The hub assembly can include (i) a hub having a plurality of apertures, (ii) a first gear that is coupled to the hub, (iii) a second gear that is coupled to the hub. The mover rotates the rotator and the hub assembly. The plurality of pinion assemblies are coupled to the plurality of apertures. Each of the plurality of pinion assemblies can include (i) a pinion, and (ii) an arm coupler that is coupled to the pinion. The mover can be configured to rotate a portion of the hub assembly so that each of the plurality of pinion assemblies rotates about the rotator axis.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a kinetic device. In particular, the present invention can be used as a visual simulation device in the context of art and visual designs. In particular, the kinetic device can include a rotator and a hub that is fixed to the rotator. The hub can include a plurality of apertures. The kinetic device can also include a mover that rotates the rotator and the hub. Further, the kinetic device can include a plurality of pinions selectively coupled to the plurality of apertures. With this approach, many kinetic visualizations and designs can be realized. The present invention can create visual illusions using the described devices and methods.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention, as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming, but would nevertheless be a routine undertaking of engineering for those of ordinary skill in the art having the benefit of this disclosure.

Figure 1:
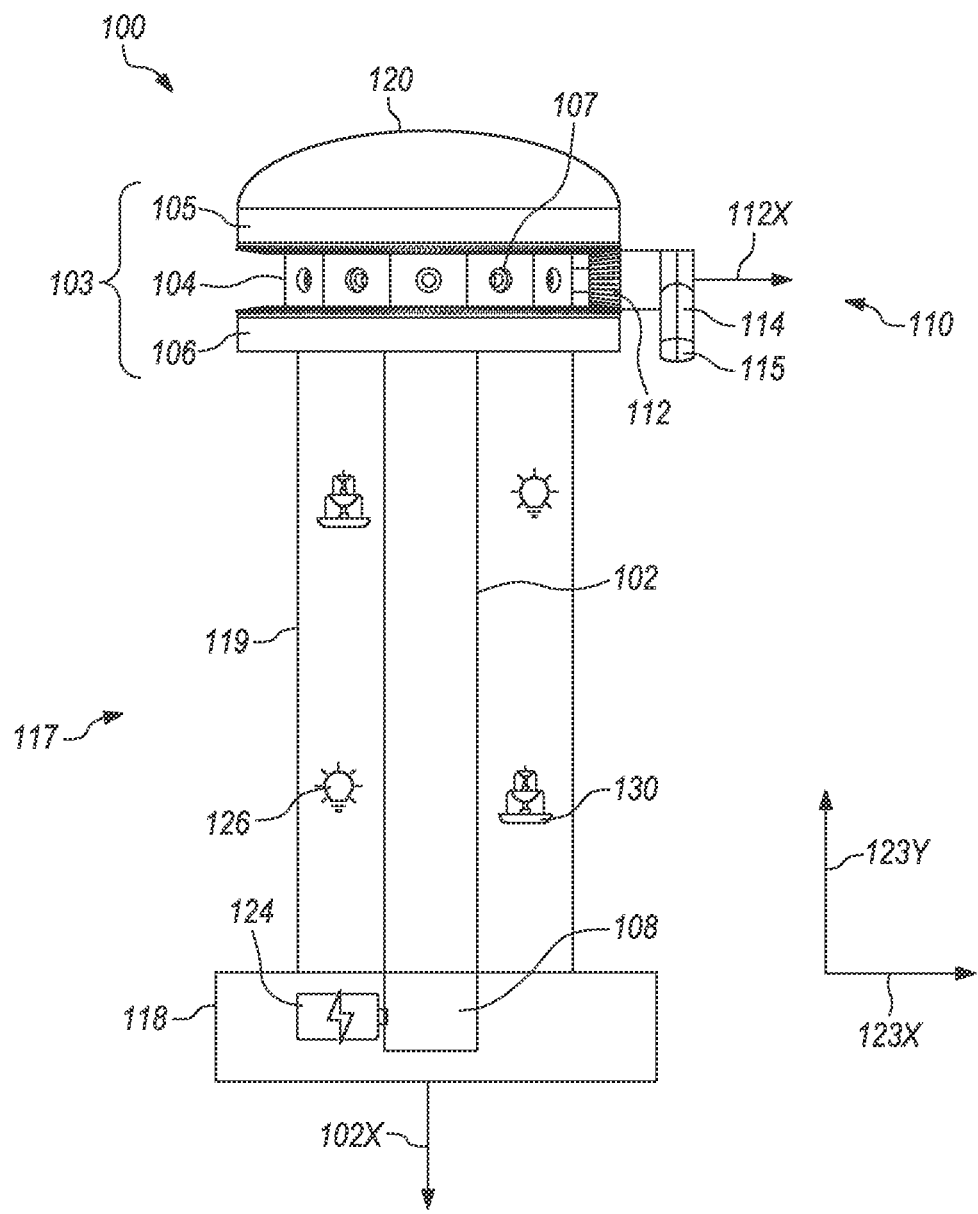
FIG. 1 is a simplified schematic view of a kinetic device depicting one embodiment of a kinetic device having features of the present invention.

FIG. 1 is a simplified schematic view of one embodiment of a kinetic device 100. The kinetic device 100 can move one or more of its various components to provide a visual design and/or illusion. Components can be coupled to various portions of the kinetic device 100. The kinetic device 100 can be mounted to any suitable surface, including floors, walls, and/or ceilings, as non-limiting, non-exclusive examples. In other embodiments, the kinetic device 100 can be coupled to structures such as rods so that the kinetic device 100 can move along one or more dimensionalities (e.g., the length of a rod) of the structure.

The kinetic device 100 can vary. It is understood that the kinetic device 100 can include additional components, systems, subsystems, and elements other than those specifically shown and/or described herein. Additionally, or alternatively, the kinetic device 100 can omit one or more of the components, systems, subsystems, and elements that are specifically shown and/or described herein. It is appreciated that while the individual components, subcomponents, and systems of the kinetic device 100 are referred to by their singular form, it is understood that the kinetic device 100 can include any suitable number of each component, subcomponent, and system. The individual components, subcomponents, and systems of the kinetic device 100 can be at least partially formed from aluminum.

In the embodiment illustrated in FIG. 1, the kinetic device 100 includes a rotator 102 having a rotator axis 102X and a hub assembly 103. Although one rotator 102 and one hub assembly 103 are illustrated in FIG. 1, it is understood that the kinetic device 100 can include any suitable number of rotators 102 and hub assemblies 103.

The rotator 102 can be selectively secured, coupled, or otherwise fastened to the hub assembly 103. The rotator 102 and the hub assembly 103 can cooperate to rotate and/or move in unison. The rotator 102 can cooperate with and rotate components of the kinetic device 100 other than the hub assembly 103.

The rotator 102 can vary depending on the design requirements of the kinetic device 100 and/or the hub assembly 103. It is understood that the rotator 102 can include additional components, systems, subsystems, and elements other than those specifically shown and/or described herein. Additionally, or alternatively, the rotator 102 can omit one or more of the components, systems, subsystems, and elements that are specifically shown and/or described herein. The rotator 102 can include a drive shaft and/or any suitable component for transmitting mechanical power, torque, and rotation to components within the kinetic device 100.

The hub assembly 103 can be selectively secured, coupled, or otherwise fastened to the rotator 102. The hub assembly 103 can cooperate with and secure components of the kinetic device 100 other than the rotator 102. The hub assembly 103 can be configured to receive other components of the kinetic device 100, including the rotator 102.

The hub assembly 103 can vary depending on the design requirements of the kinetic device 100 and/or the rotator 102. It is understood that the hub assembly 103 can include additional components, systems, subsystems, and elements other than those specifically shown and/or described herein. Additionally, or alternatively, the hub assembly 103 can omit one or more of the components, systems, subsystems, and elements that are specifically shown and/or described herein. As illustrated in FIG. 1, the hub assembly 103 can include a hub 104, a first gear 105, and a second gear 106.

The hub 104 can be configured to rotate and/or move about any number of axes. The hub 104 can also be static. The hub 104 can move in unison with the rotator 102 and/or other components of the kinetic device 100. The hub 104 can be configured to receive other components of the kinetic device 100. The hub 104 can be configured to spin on a bearing assembly 334 (illustrated in FIG. 3).

The hub 104 can vary depending on the design requirements of the kinetic device 100, the rotator 102, and/or the hub assembly 103. It is understood that the hub 104 can include additional components, systems, subsystems, and elements than those specifically shown and/or described herein. Additionally, or alternatively, the hub 104 can omit one or more of the components, systems, subsystems, and elements that are specifically shown and/or described herein.

The hub 104 can be coupled to the first gear 105, the second gear 106, or both gears simultaneously. The hub 104 can rotate in unison with the first gear 105, the second gear 106, or both gears simultaneously. The hub 104 can include one or more apertures 107.

The first gear 105 can transmit torque and/or a motion force on any component of the kinetic device 100. In some embodiments, the first gear 105 applies a force to the hub 104 and/or the second gear 106. The first gear 105 can change the speed, torque, and/or direction of any component of the kinetic device 100. The first gear 105 can cooperate with one or more other gears to create a transmission. The first gear 105 can be configured to rotate and/or move about any number of axes, as described in greater detail herein. The first gear 105 can move in unison with the rotator 102 and/or other components of the kinetic device 100. Alternatively, the first gear 105 can be static.

The first gear 105 can vary depending on the design requirements of the kinetic device 100, the rotator 102, and/or the hub assembly 103. It is understood that the first gear 105 can include additional components, systems, subsystems, and elements other than those specifically shown and/or described herein. Additionally, or alternatively, the first gear 105 can omit one or more of the components, systems, subsystems, and elements that are specifically shown and/or described herein.

While the first gear 105 is illustrated as one gear in the embodiment displayed in FIG. 1, it is appreciated that the first gear 105 can include more than one gear and/or a system of gears and other mechanical components. The first gear 105 can include beveling and/or teeth. The first gear 105 can include a bevel gear and/or a planetary gear.

The second gear 106 can transmit torque and/or a motion force on any component of the kinetic device 100. In some embodiments, the second gear 106 applies a force to the hub 104 and/or the first gear 105. The second gear 106 can change the speed, torque, and/or direction of any component of the kinetic device 100. The second gear 106 can cooperate with one or more other gears to create a transmission. The second gear 106 can be configured to rotate and/or move about any number of axes (described in greater detail herein). The second gear 106 can move in unison with the rotator 102 and/or other components of the kinetic device 100. Alternatively, the second gear 106 can be static. The hub assembly 103, the hub 104, the first gear 105, and the second gear 106 can rotate about any suitable axes, including the rotator axis 102X, the pinion axis 112X, the first axis 123X, and/or the second axis 123Y. In some embodiments, the mover 108 can be configured so that a portion of hub assembly 103, the hub 104, the first gear 105, and the second gear 106 rotate about the rotator axis 102X, the pinion axis 112X, the first axis 123X, and/or the second axis 123Y.

The second gear 106 can vary depending on the design requirements of the kinetic device 100, the rotator 102, and/or the hub assembly 103. It is understood that the second gear 106 can include additional components, systems, subsystems, and elements than those specifically shown and/or described herein. Additionally, or alternatively, the second gear 106 can omit one or more of the components, systems, subsystems, and elements that are specifically shown and/or described herein.

While the second gear 106 is illustrated as one gear in the embodiment displayed in FIG. 1, it is appreciated that the second gear 106 can include more than one gear and/or a system of gears and other mechanical components. The second gear 106 can include beveling and/or teeth. In various embodiments, the second gear 106 can include a bevel gear and/or a planetary gear.

Figure 2:
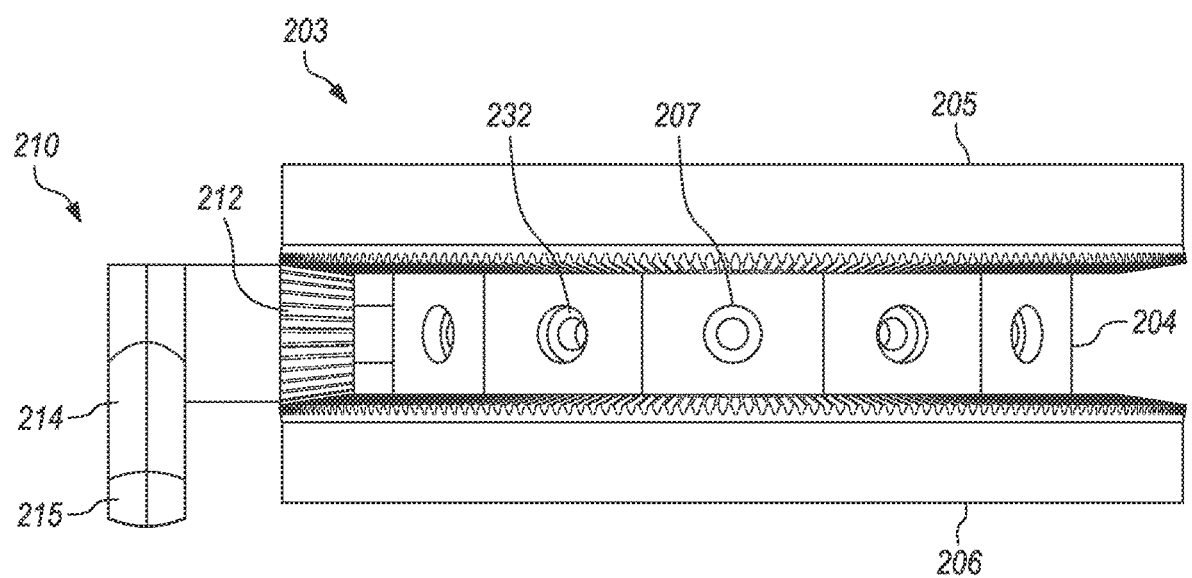
FIG. 2 is a front elevation view of one embodiment of a portion of a kinetic device, including a hub assembly.

The apertures 107 can be configured to receive one or more aperture bearings 232 (illustrated in FIG. 2, for example). In one embodiment, the apertures 107 can be evenly distributed about the circumference of the hub 104. Alternatively, the apertures 107 can have a random or semi-random distribution about the circumference of the hub 104. In certain embodiments, the hub 104 can include twelve apertures 107 that are evenly distributed at thirty-degree offsets about the circumference of the hub 104. The hub 104 can include any suitable number of apertures 107.

The apertures 107 can vary depending on the design requirements of the kinetic device 100, the hub assembly 103, and/or the hub 104. It is understood that the apertures 107 can include additional components, systems, subsystems, and elements than those specifically shown and/or described herein. Additionally, or alternatively, the apertures 107 can omit one or more of the components, systems, subsystems, and elements that are specifically shown and/or described herein. As illustrated in FIG. 1, the kinetic device 100 can further include a mover 108 and one or more pinion assemblies 110.

The mover 108 can use energy to produce motion. The mover 108 can receive energy from any viable power source 124. The mover 108 can apply motion to one or more of the components of the kinetic device 100, including but not limited to, the rotator 102, the hub assembly 103, the hub 104, the first gear 105, and/or the second gear 106. In some embodiments, the mover 108 can be coupled only to the hub 104, and the first gear 105 can be removed from the kinetic device 100.

The mover 108 can vary depending on the design requirements of the kinetic device 100, the rotator 102, the hub assembly 103, and/or the hub 104. It is understood that the mover 108 can include additional components, systems, subsystems, and elements other than those specifically shown and/or described herein. Additionally, or alternatively, the mover 108 can omit one or more of the components, systems, subsystems, and elements that are specifically shown and/or described herein. In some embodiments, the mover 108 can include a motor.

Each pinion assembly 110 can be inserted into any of the apertures 107. Upon insertion, the rotation of the pinion assembly 110 can be driven by the mover 108 and/or by any of the other mechanical components of the kinetic device 100. The pinion assembly 110 can also drive other mechanical components of the kinetic device 100, such as the first gear 105 and/or the second gear 106. Any suitable number of pinion assemblies 110 can be inserted into and/or coupled to the hub 104 and/or the apertures 107. Alternatively, the pinion assemblies 110 can be coupled to any suitable locations on the kinetic device 100. The pinion assembly 110 can rotate about any suitable axes, including the rotator axis 102X, the pinion axis 112X, the first axis 123X, and/or the second axis 123Y. In some embodiments, the mover 108 can be configured so that a portion of the pinion assembly 110 rotates about the rotator axis 102X, the pinion axis 112X, the first axis 123X, and/or the second axis 123Y.

The pinion assembly 110 can vary depending on the design requirements of the kinetic device 100, the rotator 102, the hub assembly 103, and/or the hub 104. It is understood that the pinion assembly 110 can include additional components, systems, subsystems, and elements other than those specifically shown and/or described herein. Additionally, or alternatively, the pinion assembly 110 can omit one or more of the components, systems, subsystems, and elements that are specifically shown and/or described herein. The kinetic device 100 can include any suitable number of pinion assemblies 110.

Each pinion assembly 110 can include a pinion 112 having a corresponding pinion axis 112X, an arm coupler 114, and an arm 115. As used herein, the "arm coupler" 114 is understood to mean a structure or system of structures capable of coupling and/or receiving components and attachments. In some embodiments, the arm coupler 114 can include fasteners such as bolts, clamps, connectors, couplings, dowels, hook and loops, latches, locks, retaining rings, rivets, roll pins, and/or screws, as non-limiting, non-exclusive examples of suitable arm couplers 114.

In various embodiments, the pinion 112 can include a gear adapted for mechanical use within the kinetic device 100. The pinion 112 can interact with the first gear 105 and/or the second gear 106. The pinion 112 and the other gears can cooperate as a drivetrain and/or a rack and pinion system. The pinion 112 can include beveling and/or teeth that mechanically cooperate with the beveling and/or teeth of the first gear 105 and/or the second gear 105.

The pinion 112 can vary depending on the design requirements of the kinetic device 100, the hub assembly 103, the hub 104, the first gear 105, the second gear 106, and/or the pinion assembly 110. It is understood that the pinion 112 can include additional components, systems, subsystems, and elements than those specifically shown and/or described herein. Additionally, or alternatively, the pinion 112 can omit one or more of the components, systems, subsystems, and elements that are specifically shown and/or described herein.

The pinion 112 and/or the pinion assembly 110 can be configured to rotate about the pinion axis 112X. It is understood that the pinion axis 112X illustrated in FIG. 1 is for representative purposes and ease of understanding. It is recognized that each pinion assembly 110 includes its own pinion axis 112X, which can be different for each pinion assembly 110 because the pinion assemblies 110 are positioned around the circumference of the hub 104, thereby providing up to an infinite number of potential different pinion axes 112X about the circumference (limited only by the actual number of pinions 112).

In some embodiments, the pinions 112 can be positionally offset from each other at any suitable rotational orientation about the pinion axis 112X. In other embodiments, the pinions 112 can each be simultaneously positioned at the same rotational orientation about the pinion axis 112X.

As used herein, "rotational orientation" is understood to mean the relative positioning of an object or a component of the kinetic device 100 at any given time about any suitable pinion axis 112 (e.g., twelve o'clock, one o'clock, etc.).

In various embodiments, the arm coupler 114 is coupled to the pinion 112. The arm coupler 114 and the pinion 112 can rotate in unison about the pinion axis 112X. In some embodiments, the pinion axis 112X can move in unison with the hub 104. The pinion 112 can rotate about any suitable axes, including the rotator axis 102X, the pinion axis 112X, the first axis 123X, and/or the second axis 123Y. In some embodiments, the mover 108 can be configured so that a portion of the pinion 112 rotates about the rotator axis 102X, the pinion axis 112X, the first axis 123X, and/or the second axis 123Y.

Any suitable component can be coupled to the arm coupler 114. One or more arm couplers 114 can each rotate at the same speed. The arm couplers 114 can move and/or rotate in unison to create a visual effect and/or design. In one embodiment, the arm couplers 114 can be fixed to the pinions 112 at a ninety-degree angle so that all the arm couplers 114 are tangent to the center of rotation of the hub 104. In other embodiments, the arm coupler 114 can be coupled to the pinion 112 so that the arm coupler 114 is substantially perpendicular to the pinion axis 112X. The kinetic device 100 can include any suitable number of arm couplers 114. In one embodiment, the kinetic device 100 utilizes eight arm couplers 114. In other embodiments, the kinetic device 100 includes twelve arm couplers 114 that are evenly distributed at thirty-degree offsets about the circumference of the hub 104. However, the kinetic device 100 can include greater than twelve arm couplers 114 or fewer than eight arm couplers 114 to meet the design requirements of the kinetic device 100.

In some embodiments, the arm couplers 114 can be positionally offset relative to each other at any suitable rotational orientation about the corresponding pinion axes 112X. In other embodiments, the arm couplers 114 can each be simultaneously positioned at the same or approximately the same rotational orientation about the corresponding pinion axes 112X. For example, in certain embodiments, all of the arm couplers 114 can be simultaneously positioned at the twelve o-clock position relative to their corresponding pinion axes 112X, while the arm couplers 114 are stationary.

As used herein, "approximately the same rotational orientation" is understood to mean at least within a slight manufacturing variance and/or an engineering tolerance so that the rotational orientation of the component visually appears to be at the same rotational orientation. In other words, "approximately the same rotational orientation" can be understood to mean visually the same, even though it may not measure to be at the same rotational orientation (e.g., within a few hundredths or tenths of a degree, as non-limiting, not exclusive examples).

Figure 6A:
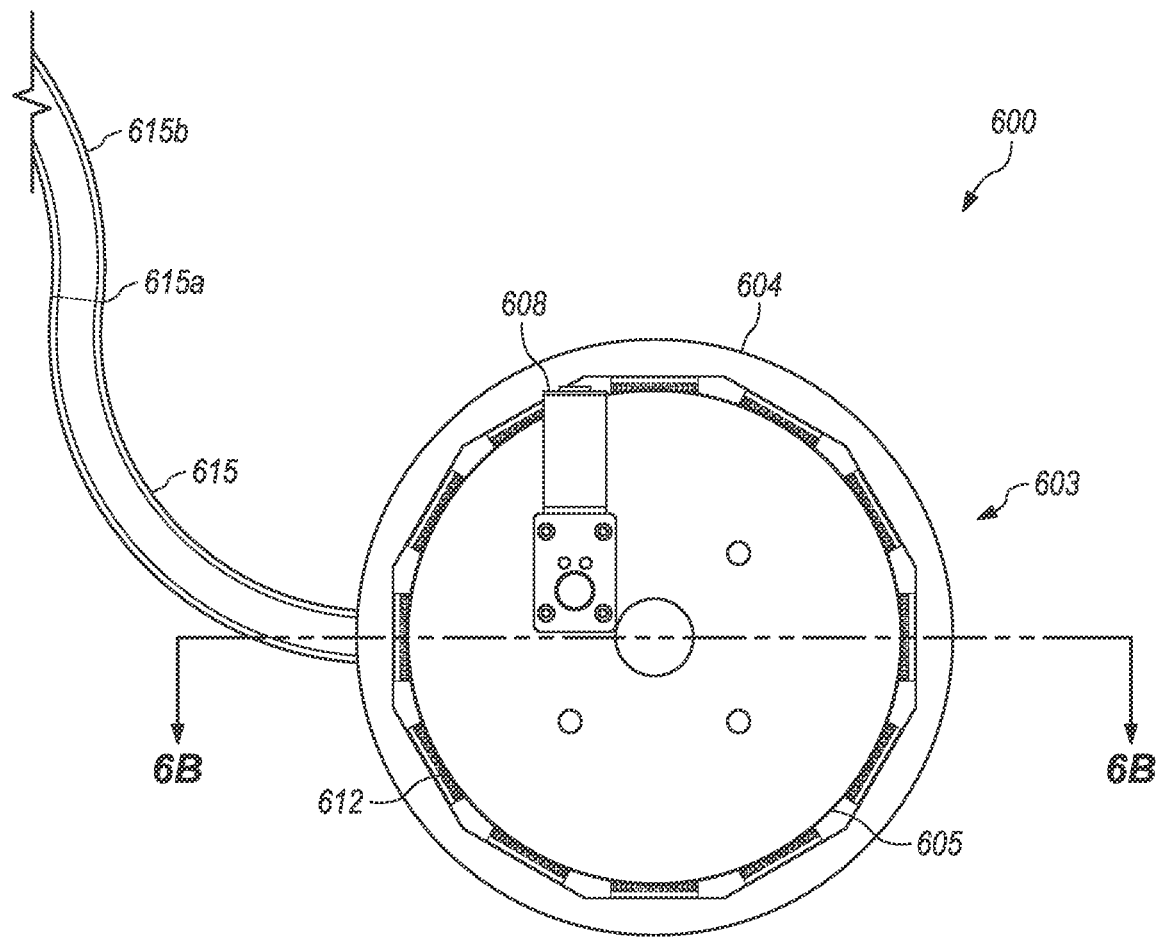
FIG. 6A is a top view of one embodiment of a portion of a kinetic device, including a hub assembly.
Figure 6B:
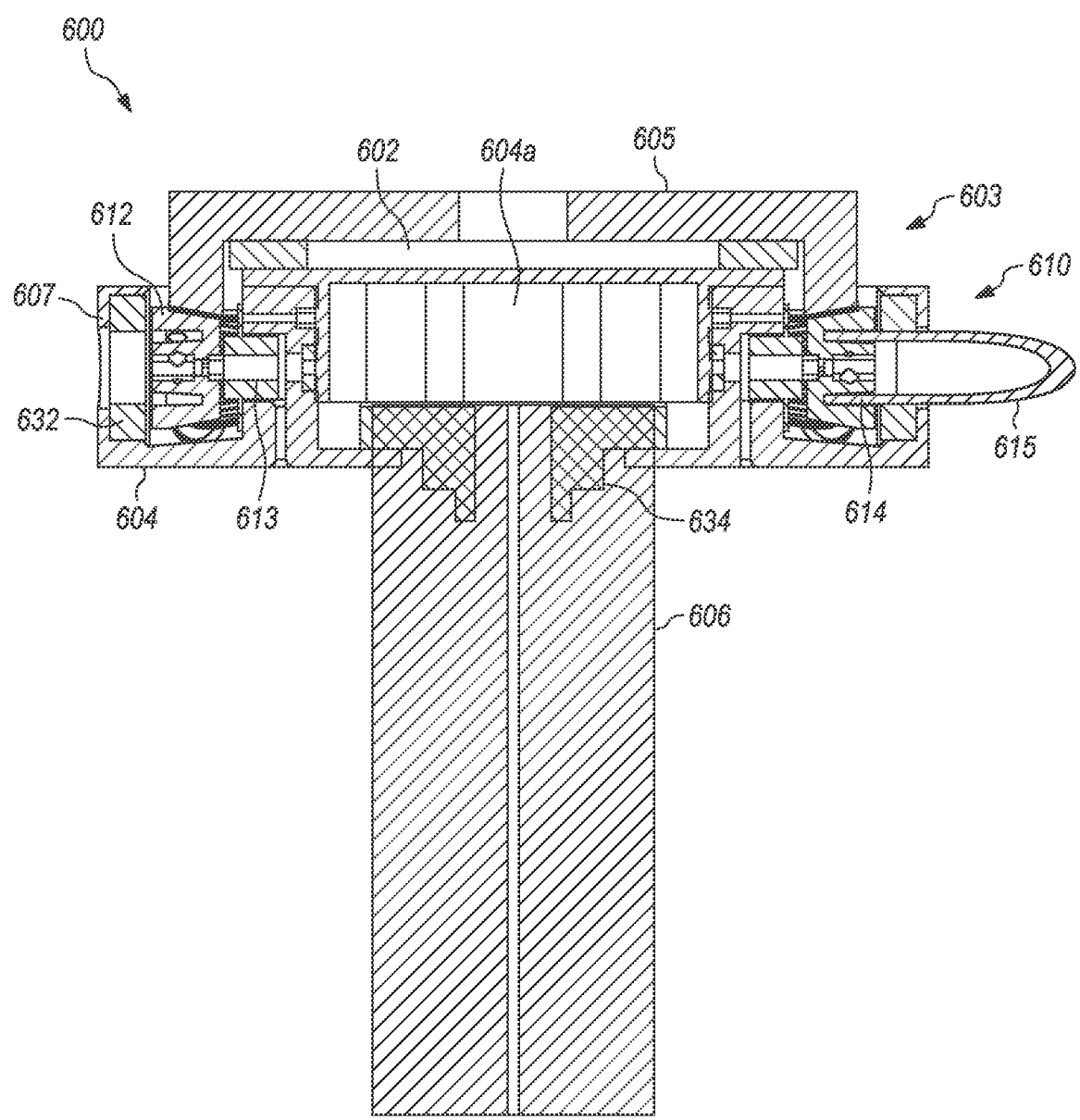
FIG. 6B is a cross-sectional view of the portion of the kinetic device taken on lines 6B-6B in FIG. 6A.

In other embodiments, each of the arm couplers 114 can be positionally offset by 360/n degrees about the corresponding pinion axis 112X relative to each other, where n is the number of arm couplers 114 utilized by the kinetic device 100. For example, in the embodiment illustrated in FIGS. 6A and 6B, there are twelve pinions 612 (shown in FIGS. 6A and 6B) and twelve arm couplers 614 (shown in FIG. 6B). In FIG. 6A, the arm coupler 614 located at a nine o'clock position (relative to the top view shown in FIG. 6A) can have an rotational orientation about the corresponding pinion axis 112 that is 180 degrees positionally offset from the arm coupler 614 located at a three o'clock position (relative to the top view shown in FIG. 6A). Each of the arm couplers 614 shown in the embodiment illustrated in FIGS. 6A and 6B are positionally offset by 30 degrees about the pinion axis 112X.

The arm coupler 114 can vary depending on the design requirements of the kinetic device 100, the hub assembly 103, the hub 104, the pinion assembly 110, and/or the pinion 112. It is understood that the arm coupler 114 can include additional components, systems, subsystems, and elements than those specifically shown and/or described herein. Additionally, or alternatively, the arm coupler 114 can omit one or more of the components, systems, subsystems, and elements that are specifically shown and/or described herein.

Figure 8:
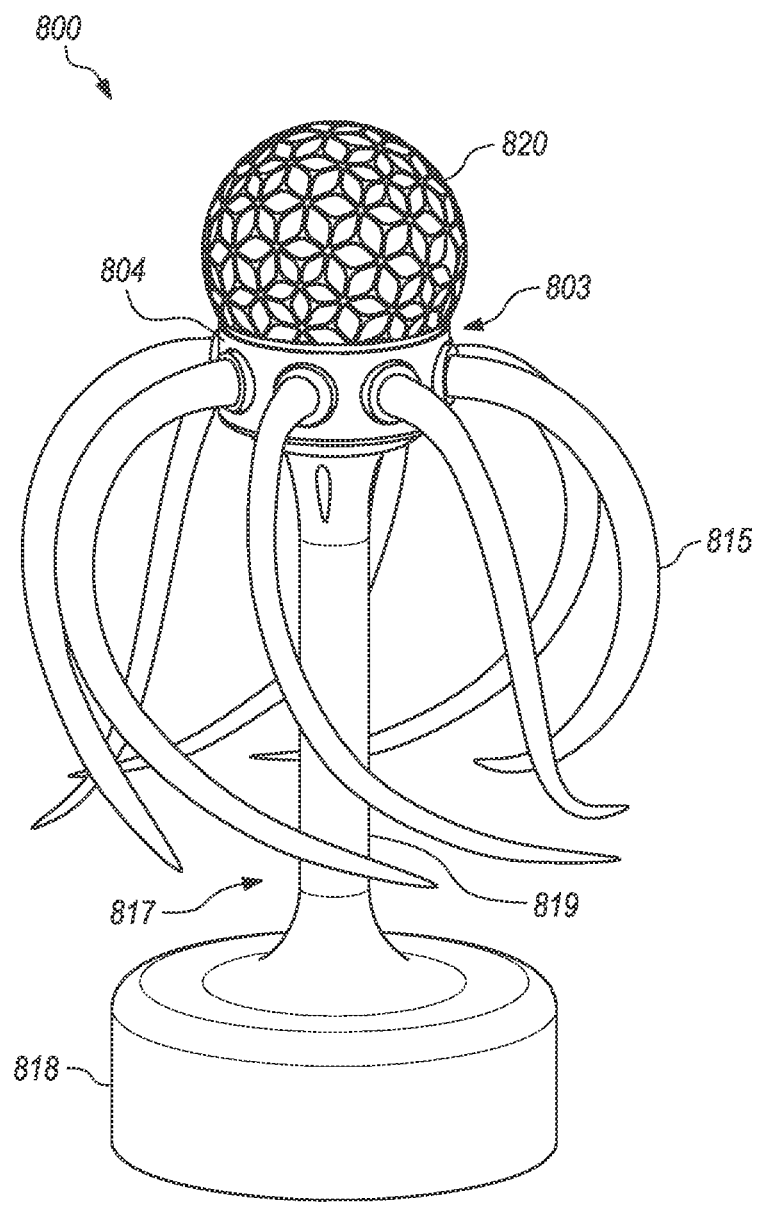
FIG. 8 is a front perspective view of one embodiment of a kinetic device.

The arm coupler 114 can be formed to have any suitable shape. In some embodiments, the arm couplers 114 can have a somewhat of a v-shape, an s-shape (such as illustrated in FIG. 8), a u-shape, an n-shape, a c-shape, a q-shape, an I-shape, an m-shape, a p-shape, or any other suitable configuration. The arm couplers 114 can be formed so that they have a shape based on any letter of the English alphabet and/or a shape that is substantially similar to any letter of the English alphabet. The arm couplers 114 can be formed to have a substantially curved shape. The arm couplers 114 can be formed to have a patterned shape. As used herein "patterned" is understood to mean a model and/or design based on a pattern (e.g., a series of objects and/or images spaced evenly). The arm couplers 114 can be formed to have a shape based on an image and/or an object. The arm coupler 114 can include an arm 115.

The arm 115 allows components, attachments, and/or features to be coupled to the arm coupler 114. The arm 115 can be affixed and/or coupled to any element and/or component of the kinetic device 100. Arm extensions (not shown), fluid features 130, illuminators 126, visual enhancers (not shown) and/or structural enhancers (not shown) can be coupled to the arm coupler 114 via the arm 115, as non-limiting, non-exclusive examples. As used herein, the "enhancer" is understood to mean a mechanical component capable of improving and/or enhancing any suitable component of the kinetic device 100. The arm coupler 114 and the arm 115 can rotate about any suitable axes, including the rotator axis 102X, the pinion axis 112X, the first axis 123X, and/or the second axis 123Y. In some embodiments, the mover 108 can be configured so that a portion of the arm coupler 114 and the arm 115 rotate about the rotator axis 102X, the pinion axis 112X, the first axis 123X, and/or the second axis 123Y.

The arm 115 can vary depending on the design requirements of the kinetic device 100 and/or the arm coupler 114. It is understood that the arm 115 can include additional components, systems, subsystems, and elements than those specifically shown and/or described herein. Additionally, or alternatively, the arm 115 can omit one or more of the components, systems, subsystems, and elements that are specifically shown and/or described herein.

The kinetic device 100 can also include a stand 117. The stand 117 can support the weight of the kinetic device 100. The stand 117 can be coupled to the hub assembly 103. In certain embodiments, the stand 117 is coupled to the second gear 106.

The stand 117 can vary depending on the design requirements of the kinetic device 100 and/or the hub assembly 103. The stand 117 can include a base assembly 118 and a housing assembly 119. It is understood that the stand 117 can include additional components, systems, subsystems, and elements than those specifically shown and/or described herein. Additionally, or alternatively, the stand 117 can omit one or more of the components, systems, subsystems, and elements that are specifically shown and/or described herein.

The base assembly 118 can stabilize components of the kinetic device 100 and/or the stand 117. The base assembly 118 can be a foot and/or a base for the kinetic device 100. The base assembly 118 can be placed on a floor and/or any other suitable surface.

The base assembly 118 can vary depending on the design requirements of the kinetic device 100 and/or the stand 117. It is understood that the base assembly 118 can include additional components, systems, subsystems, and elements other than those specifically shown and/or described herein. Additionally, or alternatively, the base assembly 118 can omit one or more of the components, systems, subsystems, and elements that are specifically shown and/or described herein.

The housing assembly 119 can house and/or protect the interior components of the kinetic device 100, such as the rotator 102. In other embodiments, the housing assembly 119 can protect the hub assembly 103 and/or the pinion assembly 110, as non-limiting, non-exclusive examples. The housing assembly 119 can be coupled and/or attached to the base assembly 118.

The housing assembly 119 can vary depending on the design requirements of the kinetic device 100 and/or the stand 117. It is understood that the housing assembly 119 can include additional components, systems, subsystems, and elements other than those specifically shown and/or described herein. Additionally, or alternatively, the housing assembly 119 can omit one or more of the components, systems, subsystems, and elements that are specifically shown and/or described herein.

The kinetic device 100 can include a cover 120. The cover 120 can protect and/or cover the hub assembly 103. In other embodiments, the cover 120 can protect and/or cover the entire kinetic device 100. The cover 120 can enhance the visual aspects of the kinetic device 100. The cover 120 can be moved by the rotator 102 and/or the mover 108. The cover 120 can move in unison with the hub assembly 103. The cover 120 can vary depending on the design requirements of the kinetic device 100 and/or the hub assembly 103. The cover 120 and/or other components of the kinetic device 100 can be at least partially formed from reflective materials and/or mirrors.

The kinetic device 100 can include a first axis 123X and a second axis 123Y. In other embodiments, the kinetic device 100 can include additional axes. Components of the kinetic device 100 can rotate about the first axis 123X and/or the second axis 123Y. In certain embodiments, the hub 104 and the first gear 105 rotate about the second axis 123Y. In various embodiments, the pinion assembly 110 rotates about the first axis 123X. The rotator axis 102X and the second axis 123Y can be the same axis.

The kinetic device 100 can include a power source 124, an illuminator 126, and a fluid feature 130. The power source 124 can provide power to various components of the kinetic device 100. In certain embodiments, the power source 124 powers the mover 108. The power source 124 can also power the illuminators 126 and/or the fluid features 130. While the power source 124 is illustrated as a battery symbol in FIG. 1, this symbol is merely demonstrative and used for ease of understanding. It is understood that the power source 124 can include any suitable power or energy source that is configured to provide the power or energy needs of the kinetic device 100 and its individual components.

The power source 124 can vary depending on the design requirements of the kinetic device 100 and/or the mover 108. It is understood that the power source 124 can include additional components, systems, subsystems, and elements than those specifically shown and/or described herein. Additionally, or alternatively, the power source 124 can omit one or more of the components, systems, subsystems, and elements that are specifically shown and/or described herein.

The power source 124 can include an AC or DC system that can include one or more of a battery, a solar panel, an outlet, and/or a power system. In the embodiment displayed in FIG. 1, the power source 124 is located within the base assembly 118. It is appreciated that the power source 124 may be positioned in any suitable location in the kinetic device 100, including, but not limited to, the hub assembly 103, the pinion assembly 110, the stand 117, the housing assembly 119, or the cover 120.

The illuminator 126 can illuminate various portions and/or components of the kinetic device 100. The illuminators 126 can enhance the visual designs and/or illusions created by the kinetic device 100 and/or the arm couplers 114. The illuminator 126 can cooperate with reflective portions of the kinetic device 100, the cover 120, and/or the fluid feature 130 to create new visuals, illusions, shadows, and/or similar visual effects. While the illuminator 126 is illustrated as a lightbulb symbol in FIG. 1, this symbol is merely demonstrative and used for ease of understanding. It is understood that the illuminator 126 can include any light or illumination source that is configured to provide the light or illumination needs of the kinetic device 100 and its individual components.

The illuminator 126 can vary depending on the design requirements of the kinetic device 100, the mover 108, and/or the power source 124. It is understood that the illuminator 126 can include additional components, systems, subsystems, and elements than those specifically shown and/or described herein. Additionally, or alternatively, the illuminator 126 can omit one or more of the components, systems, subsystems, and elements that are specifically shown and/or described herein. The illuminator 126 can include one or more of a light source, an emitter, and/or a liquid crystal, as non-limiting, non-exclusive examples of suitable illuminators 126.

The illuminators 126 can be coupled to the arm couplers 114 via the arms 115. In the embodiment illustrated in FIG. 1, the illuminators 126 are coupled to the housing assembly 119. It is appreciated that the illuminators 126 may be positioned in any suitable location on the kinetic device 100, including, but not limited to, the hub assembly 103, the pinion assembly 110, the stand 117, the base assembly 118, and/or the cover 120.

The fluid feature 130 can allow water and/or other liquids to be expelled from various portions of the kinetic device 100. The fluid feature 130 can enhance the visual designs and/or illusions created by the kinetic device 100 and/or the arm couplers 114. The fluid feature 130 can cooperate with the arm coupler 114, the arm 115, and the illuminator 126 to create varying visual effects. While the fluid feature 130 is illustrated as a fountain symbol in FIG. 1, this symbol is merely demonstrative and used for ease of understanding. It is understood that the fluid feature 130 can include any fluid feature that is configured to provide the fluid needs of the kinetic device 100 and its individual components.

The fluid feature 130 can vary depending on the design requirements of the kinetic device 100, the mover 108, and/or the power source 124. It is understood that the fluid feature 130 can include additional components, systems, subsystems, and elements than those specifically shown and/or described herein. Additionally, or alternatively, the fluid feature 130 can omit one or more of the components, systems, subsystems, and elements that are specifically shown and/or described herein.

FIG. 2 is a front view of one embodiment of a hub assembly 203 of a kinetic device 100 (for example, illustrated in FIG. 1). As shown in FIG. 2, the hub assembly 203 can include a hub 204, a first gear 205, a second gear 206, an aperture 207, a pinion assembly 210, and an aperture bearing 232. The pinion assembly 210 can include a pinion 212, an arm coupler 214, and an arm 215.

The aperture bearing 232 can receive the pinion assembly 210 and restrain its relative motion to rotate about the pinion axis 112X (illustrated in FIG. 1). The aperture bearing 232 can also reduce the friction between each of the pinion assemblies 210 and their corresponding apertures 207.

The aperture bearing 232 can vary depending on the design requirements of the hub assembly 203, the hub 204, and/or the apertures 207. It is understood that the aperture bearing 232 can include additional components, systems, subsystems, and elements than those specifically shown and/or described herein. Additionally, or alternatively, the aperture bearing 232 can omit one or more of the components, systems, subsystems, and elements that are specifically shown and/or described herein. The aperture bearing 232 can include a pillow block bearing as a non-limiting, non-exclusive example. The aperture bearing 232 can be positioned within each of the apertures 207 and/or any other suitable location on the kinetic device 100.

Figure 3:
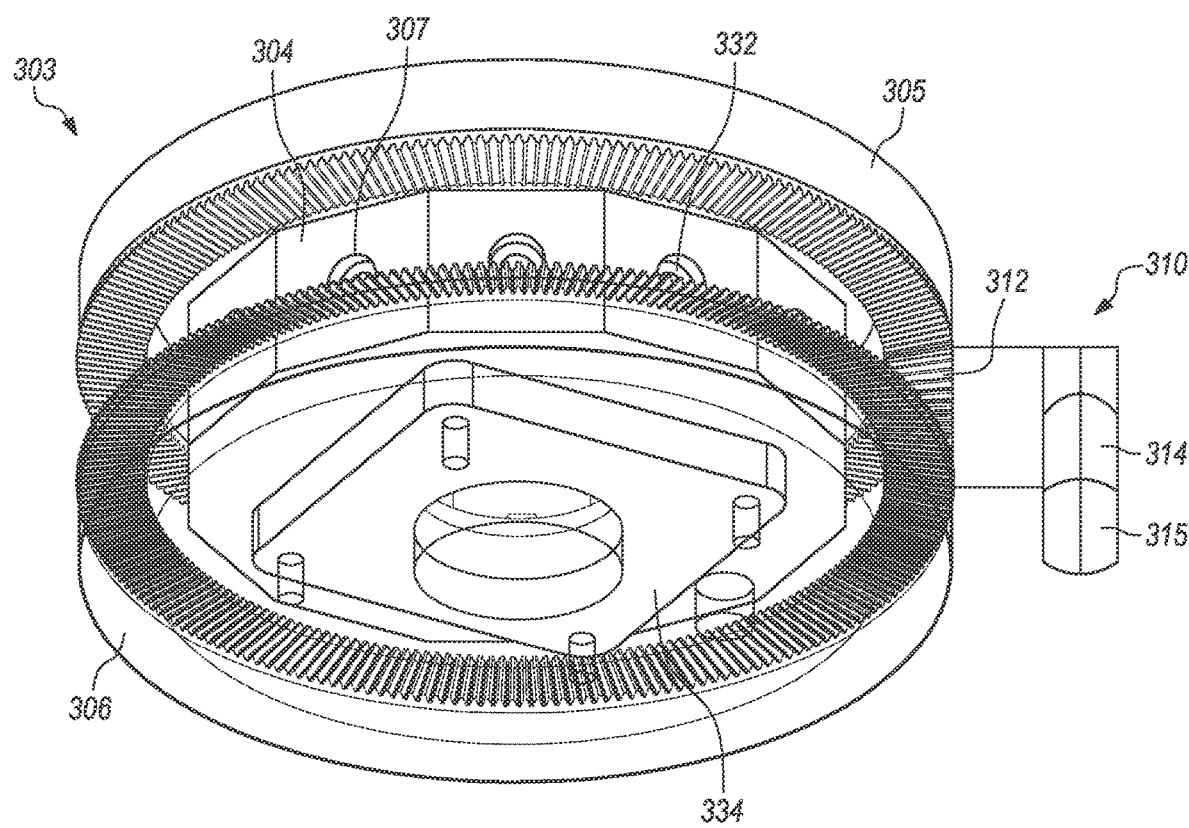
FIG. 3 is a bottom perspective view of one embodiment of a hub assembly.

FIG. 3 is a bottom perspective view of one embodiment of a hub assembly 303 of a kinetic device 100 (illustrated in FIG. 1). As shown in FIG. 3, the hub assembly 303 can include a hub 304, a first gear 305, a second gear 306, an aperture 307, a pinion assembly 310, an aperture bearing 332, and a bearing assembly 334. The pinion assembly 310 can include a pinion 312, an arm coupler 314, and an arm 315.

The bearing assembly 334 can receive the rotator 102 (illustrated in FIG. 1) and can retrain its relative motion about the rotator axis 102X (illustrated in FIG. 1). The bearing assembly 334 can also reduce the friction between the rotator 102 and the hub 304 and/or the second gear 306.

The bearing assembly 334 can vary depending on the design requirements of the hub assembly 303, the hub 304, and/or the second gear 306. It is understood that the bearing assembly 334 can include additional components, systems, subsystems, and elements other than those specifically shown and/or described herein. Additionally, or alternatively, the bearing assembly 334 can omit one or more of the components, systems, subsystems, and elements that are specifically shown and/or described herein. The bearing assembly 334 can be fixed and/or coupled to the hub 304 and/or the second gear 306. The bearing assembly 334 can also be fixed and/or coupled to any suitable component of the kinetic device 100. The bearing assembly 334 can include a bearing 835 (illustrated in FIG. 8).

Figure 4A:
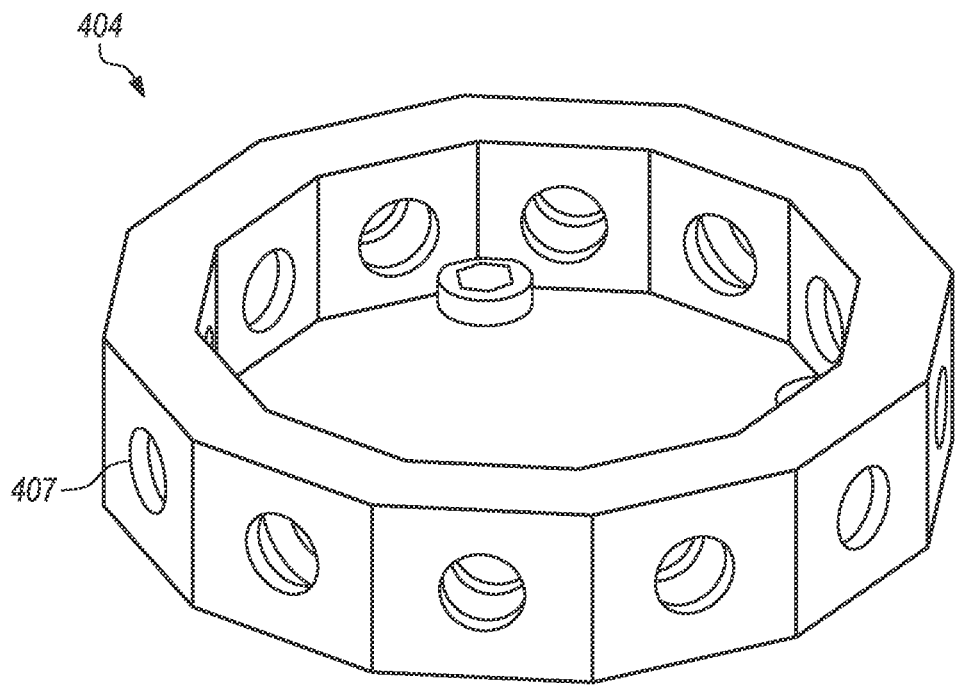
FIG. 4A is a front perspective view of one embodiment of a portion of a hub assembly, including a hub.

FIG. 4A is a front perspective view of a hub 404. As illustrated in FIG. 4A, the hub 404 can include apertures 407. The hub 404 can have a substantially polygonal shape. In the embodiment shown in FIG. 4A, the hub 404 has a dodecagon shape. In other embodiments, the hub 404 can have any suitable shape.

Figure 4B:
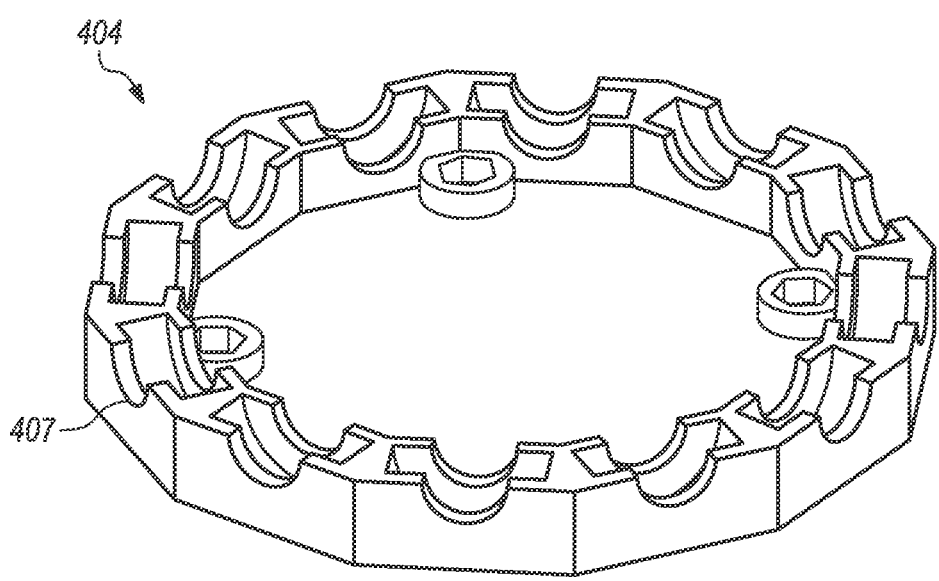
FIG. 4B is a front partially exploded perspective view of a portion of the hub illustrated in FIG. 4A.

FIG. 4B is a front partially exploded perspective view of the bottom half of the hub 404 illustrated in FIG. 4A. As illustrated in FIG. 4B, the hub 404 can include apertures 407. The bottom half of the hub 404 can be combined with the top half of the hub 404 so that each corresponding pinion assembly 310 (illustrated in FIG. 3) and each corresponding aperture bearing 332 (illustrated in FIG. 3) can be positioned into each corresponding aperture 307 (illustrated in FIG. 3). The design of the hub 404 can allow each corresponding pinion assembly 310 to be secured by each corresponding aperture 307 and aperture bearing 332.

Figure 5:
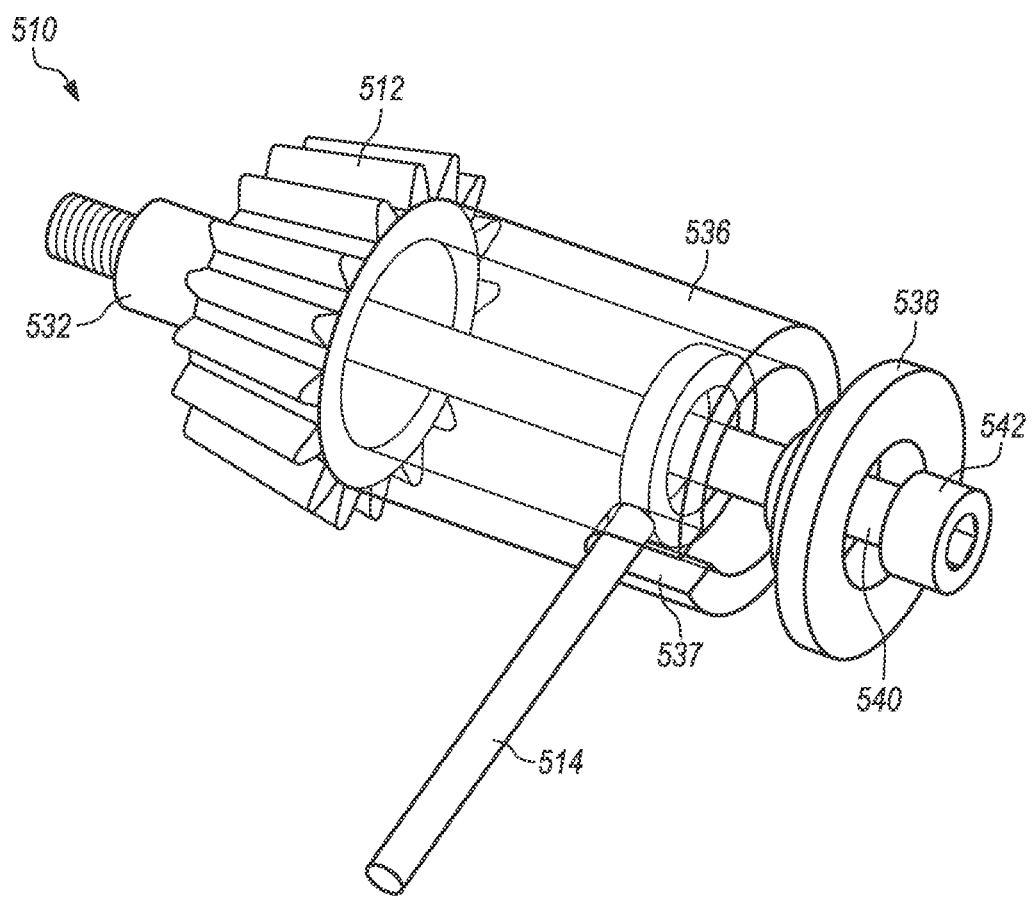
FIG. 5 is a perspective, partially transparent, partially exploded view of a portion of one embodiment of a kinetic device, including a pinion assembly.

FIG. 5 is a perspective, transparent, partially exploded view of a pinion assembly 510 of a kinetic device 100 (illustrated in FIG. 1). The pinion assembly 510 can include a pinion 512, an arm coupler 514, and an aperture bearing 532. As shown in the embodiment displayed in FIG. 5, the pinion assembly 510 can further include a tube spacer 536, a tube spacer slot 537, an endcap 538, and a pinion fastener 540 having a pinion fastener head 542.

The tube spacer 536 provides space for the rest of the components of the pinion assembly 510. The tube spacer 536 can be coupled and/or attached to the endcap 538 and/or the pinion 512. The tube spacer 536 can encircle at least a portion of the pinion fastener 540. In the embodiment illustrated in FIG. 5, the tube spacer 536 encircles a majority of the pinion fastener 540.

The tube spacer 536 can vary depending on the design requirements of the pinion assembly 510, the pinion 512, and/or the endcap 538. It is understood that the tube spacer 536 can include additional components, systems, subsystems, and elements than those specifically shown and/or described herein. Additionally, or alternatively, the tube spacer 536 can omit one or more of the components, systems, subsystems, and elements that are specifically shown and/or described herein. In some embodiments, the tube spacer 536 can include a hollow tube.

The tube spacer slot 537 can include a slot and/or aperture that protrudes into the tube spacer 536. The arm coupler 514 can be coupled to the pinion assembly 510 in the tube spacer slot 537, such as shown in the embodiment displayed in FIG. 5.

The tube spacer slot 537 can vary depending on the design requirements of the pinion assembly 510, the arm coupler 514, and/or the tube spacer 536. It is understood that the tube spacer slot 537 can include additional components, systems, subsystems, and elements than those specifically shown and/or described herein. Additionally, or alternatively, the tube spacer slot 537 can omit one or more of the components, systems, subsystems, and elements that are specifically shown and/or described herein.

The endcap 538 can be coupled and/or attached to the arm coupler 514, the tube spacer 536, and/or the pinion fastener 540. The endcap 538 can encircle a portion of the pinion fastener 540. The endcap 538 can be inserted into the tube spacer 536 so that the endcap 538 is (i) flush with one end of the tube spacer 536, and/or (ii) in contact with the arm coupler 514.

The endcap 538 can vary depending on the design requirements of the pinion assembly 510, the arm coupler 514, and/or the tube spacer 536. It is understood that the endcap 538 can include additional components, systems, subsystems, and elements than those specifically shown and/or described herein. Additionally, or alternatively, the endcap 538 can omit one or more of the components, systems, subsystems, and elements that are specifically shown and/or described herein. The endcap 538 can include bores and/or counterbores that can receive the pinion fastener 540 and/or pinion fastener head 542. The pinion fastener 540 can fasten various components of the pinion assembly 510. In some embodiments, the pinion fastener 540 can fasten the pinion 512, the aperture bearing 532, and/or the endcap 538. The pinion assembly 510 can substantially encircle the pinion fastener 540. The pinion fastener 540 can be configured to be inserted into the pinion 512, the tube spacer 536, and/or the endcap 538. In various embodiments, the pinion fastener 540 can be fastened using a hex driver and/or a screwdriver.

The pinion fastener 540 can vary depending on the design requirements of the pinion assembly 510, the pinion 512, the tube spacer 536, and/or the endcap 538. It is understood that the pinion fastener 540 can include additional components, systems, subsystems, and elements other than those specifically shown and/or described herein. Additionally, or alternatively, the pinion fastener 540 can omit one or more of the components, systems, subsystems, and elements that are specifically shown and/or described herein. In certain embodiments, the pinion fastener 540 can include a pinion fastener head 542 with a hex and/or screw slot.

As illustrated in the embodiment displayed in FIG. 5, the pinion assembly 510 is shown in a partially exploded state where the pinion fastener 540 is unfastened so that the endcap 538 protrudes outward from the tube spacer 536. In other embodiments, the pinion fastener 540 can be fastened so that the endcap 538 is flush and/or in contact with the tube spacer 536, and the pinion fastener head 542 is flush and/or in contact with the endcap 538.

FIG. 6A is a top view of one embodiment of a portion of a kinetic device 600, including a hub assembly 603. As shown in FIG. 6A, the kinetic device 600 and its components are somewhat similar in design, positioning, and function to the other embodiments included herein. In the embodiment displayed in FIG. 6A, the kinetic device 600 can be mounted so that a hub assembly 603, a pinion 612, and/or an arm 615 rotates about any suitable axis in the three-dimensional plane, including the rotator axis 102X (illustrated in FIG. 1), the pinion axis 112X (illustrated in FIG. 1), and/or the second axis 123Y (illustrated in FIG. 1), as non-limiting, non-exclusive, example axes.

The hub 604 can be fixed and/or coupled to a first gear 605. A cover 120 (illustrated in FIG. 1) can cover and/or mount the hub 604. In the embodiment illustrated in FIG. 6A, a mover 608 can be coupled to the hub assembly 603 and/or the first gear 605. An arm 615 can be affixed and/or coupled to the hub 604 and/or a pinion 612. The arm 615 can include an arm extender 615a and/or an arm extension 615a.

The arm extender 615a can extend the reach of the arm 615. As shown in FIG. 6A, the arm extension 615b can be selectively coupled to the arm 615 via the arm extender 615a. The arm 615 and/or the arm extension 615b can be uncoupled from the hub assembly 603.

The arm extender 615a and/or the arm extension 615b can vary depending on the design requirements of the hub assembly 603, the pinion assembly 510 (for example, illustrated in FIG. 5), the pinion 512 (for example, illustrated in FIG. 5), and/or the arm 615. It is understood that the arm extender 615a and/or the arm extension 615b can include additional components, systems, subsystems, and elements other than those specifically shown and/or described herein. Additionally, or alternatively, the arm extender 615a and/or the arm extension 615b can omit one or more of the components, systems, subsystems, and elements that are specifically shown and/or described herein.

The arm 615 and/or the arm extension 615b can include hollow tubing that is at least partially formed from polyethylene terephthalate. The arm 615 and/or the arm extension 615b can include an illuminator 126 (for example, illustrated in FIG. 1) that can be coupled to the interior of the arm 615 and/or the arm extension 615b. In some embodiments, the illuminator 126 includes a light-emitting diode strip.

FIG. 6B is a cross-sectional view of the portion of the kinetic device 600 taken on lines 6B-6B in FIG. 6A. As shown in FIG. 6B, the kinetic device 600 can include the rotator 602, the hub assembly 603, and the pinion assembly 610.

The hub assembly 603 can include a hub 604, a hubcap 604a, a first gear 605, a second gear 606, and/or an aperture 607. The hubcap 604a covers and/or protects the hub 604 and its interior components. The hubcap 604a can vary depending on the design requirements of the hub assembly 603 and/or the hub 604. The pinion assembly 610 can include a pinion 612, a slip ring 613, an arm coupler 614, an arm 615, and/or a bearing assembly 634.

The slip ring 613 allows the transmission of power and electrical signals from the hub 604 to the pinion assembly 610 and/or the arm 615. In some embodiments, the slip ring 613 allows power transmission from the hub 604 to the illuminator 126 (for example, illustrated in FIG. 1) while the pinion assembly 610 is in motion. The slip ring 613 can vary depending on the design requirements of the hub assembly 603, the hub 604, and/or the pinion assembly 610.

The bearing assembly 634 can receive the rotator 602 and can retrain its relative motion about the rotator axis 102X (illustrated in FIG. 1). The bearing assembly 334 can also reduce the friction between the rotator 602 and the hub 604 and/or the second gear 606.

Figure 7:
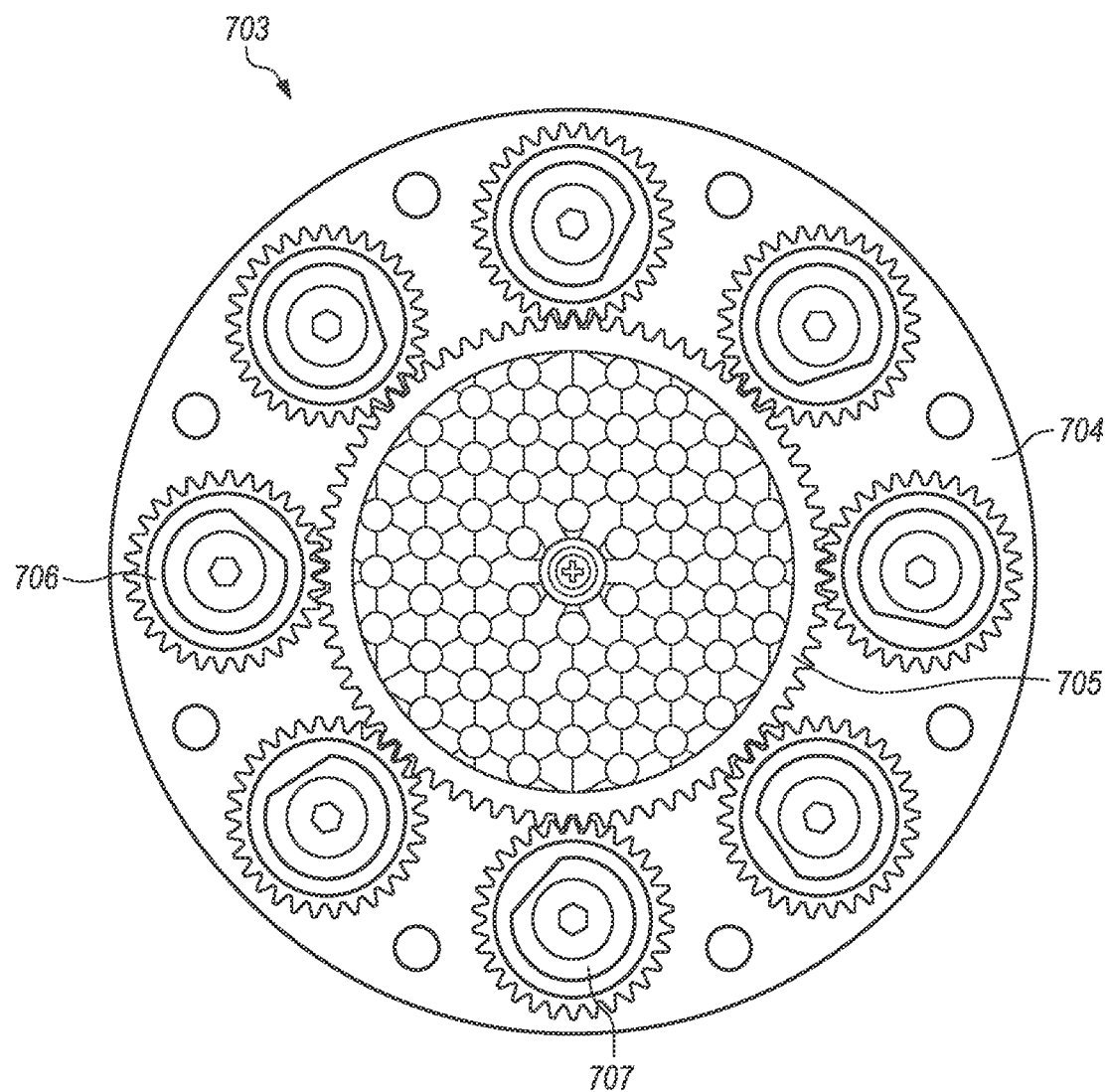
FIG. 7 is a top view of a portion of one embodiment of a kinetic device, including a portion of a hub assembly.

FIG. 7 is a top view of a portion of one embodiment of a kinetic device 100 (illustrated in FIG. 1), including a portion of a hub assembly 703. As shown in FIG. 7, the hub assembly 703 and its components are somewhat similar in design, positioning, and function to the other embodiments included herein. The hub assembly 703 can include a hub 704, a first gear 705, a second gear 706, and/or an aperture 707. As illustrated in FIG. 7, the hub assembly 703 can include an epicyclic gear assembly and/or a planetary gear assembly. In certain embodiments, the hub assembly 703 can function in a somewhat similar manner to an epicyclic gear assembly and/or a planetary gear assembly.

FIG. 8 is a front perspective view of one embodiment of a kinetic device 800. As shown in FIG. 8, the kinetic device 800 and its components are somewhat similar in design, positioning, and function to the other embodiments included herein. As illustrated in FIG. 8, the kinetic device 800 can include a hub assembly 803 including a hub 804, an arm 815, a stand 817 including a base assembly 818, and a housing assembly 819, and a cover 820.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications can be made while remaining within the spirit and scope herein.

It is understood that although a number of different embodiments of the systems and methods have been illustrated and described herein, one or more features of any one embodiment can be combined with one or more features of one or more of the other embodiments, provided that such combination satisfies the intent of the present invention.

While a number of exemplary aspects and embodiments of the user interface and methods have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope, and no limitations are intended to the details of construction or design herein shown.

What is claimed is:

1. A kinetic device, comprising:
a rotator having a rotator axis;
a hub assembly that is coupled to the rotator, the hub assembly including a hub having an aperture;
a mover that rotates the rotator and the hub assembly; and
a pinion assembly that is coupled to the aperture, the pinion assembly including an arm coupler, the mover being configured to rotate a portion of the hub assembly so that the pinion assembly and the arm coupler rotate about the rotator axis.

2. The kinetic device of claim 1 wherein the hub assembly includes (i) a first gear that is coupled to the hub, and (ii) a second gear that is coupled to the hub.

3. The kinetic device of claim 2 wherein the hub assembly includes a bearing assembly that is coupled to the hub and the second gear, the bearing assembly being configured to enable rotation of the hub.

4. The kinetic device of claim 1 wherein the pinion assembly includes a pinion having a pinion axis, the pinion being coupled to the arm coupler, and the mover is configured to rotate a portion of the hub assembly so that the pinion assembly, the pinion, and the arm coupler rotate about the pinion axis.

5. The kinetic device of claim 4 wherein the rotator axis is substantially orthogonal to the pinion axis.

6. The kinetic device of claim 4 wherein the pinion assembly includes a pinion fastener that fastens the arm coupler to the pinion.

7. The kinetic device of claim 6 wherein the pinion assembly includes an aperture bearing that is coupled to the pinion fastener and the aperture.

8. The kinetic device of claim 4 wherein the arm coupler is coupled to the pinion so that the arm coupler is substantially perpendicular to the pinion axis.

9. The kinetic device of claim 1 further comprising a first pinion assembly and a second pinion assembly, the pinion assemblies being coupled to the hub, each of the pinion assemblies including (i) a pinion having a corresponding pinion axis, and (ii) an arm coupler coupled to the pinion, each of the arm couplers being simultaneously positioned about the corresponding pinion axes at approximately the same rotational orientation as one another.

10. The kinetic device of claim 1 further comprising a first pinion assembly and a second pinion assembly, the pinion assemblies being coupled to the hub, each of the pinion assemblies including (i) a pinion having a corresponding pinion axis, and (ii) an arm coupler coupled to the pinion, each of the arm couplers being simultaneously positioned about the corresponding pinion axes at different rotational orientations from one another.

11. A kinetic device comprising:
a rotator having a rotator axis;
a hub assembly that is coupled to the rotator, the hub assembly including a hub having a plurality of apertures;
a mover that rotates the rotator and the hub assembly; and
a plurality of pinion assemblies that are coupled to the plurality of apertures, each of the plurality of pinion assemblies including (i) a pinion, and (ii) an arm coupler that is coupled to the pinion, the mover being configured to rotate a portion of the hub assembly so that each of the plurality of pinion assemblies rotates about the rotator axis.

12. The kinetic device of claim 11 wherein the hub assembly includes a gear that is coupled to the hub.

13. The kinetic device of claim 12 wherein the hub assembly includes a bearing assembly that is coupled to the hub and the gear, the bearing assembly being configured to enable rotation of the hub.

14. The kinetic device of claim 12 wherein each of the plurality of pinion assemblies has a corresponding pinion axis and the mover is configured to rotate a portion of the hub assembly so that each of the plurality of pinion assemblies rotates about each of the corresponding pinion axes.

15. The kinetic device of claim 14 wherein the rotator axis is substantially orthogonal to each of the corresponding pinion axes.

16. The kinetic device of claim 14 wherein the arm coupler is coupled to the pinion so that the arm coupler is substantially orthogonal to each of the corresponding pinion axes.

17. The kinetic device of claim 11 wherein each of the plurality of pinion assemblies includes a pinion fastener that fastens the arm coupler to the pinion.

18. The kinetic device of claim 11 wherein each of the plurality of pinion assemblies includes a pinion fastener that fastens the arm coupler to the pinion.

19. The kinetic device of claim 18 wherein each of the plurality of pinion assemblies includes an aperture bearing that is coupled to the pinion fastener and the aperture.

20. A kinetic device comprising:
a rotator having a rotator axis;
a hub assembly that is coupled to the rotator, the hub assembly including (i) a hub having a plurality of apertures, (ii) a first gear that is coupled to the hub, (iii) a second gear that is coupled to the hub;
a mover that rotates the rotator and the hub assembly; and
a plurality of pinion assemblies that are coupled to the plurality of apertures, each of the plurality of pinion assemblies including (i) a pinion, and (ii) an arm coupler that is coupled to the pinion, the mover being configured to rotate a portion of the hub assembly so that each of the plurality of pinion assemblies rotates about the rotator axis.

* * * * *